United States Patent [19]
Campbell

[11] Patent Number: 5,182,805
[45] Date of Patent: Jan. 26, 1993

[54] METHOD AND SYSTEM FOR DETERMINING COPY-ON-WRITE CONDITION

[75] Inventor: Mark D. Campbell, Lexington, S.C.

[73] Assignee: NCR Corporation, Dayton, Ohio

[21] Appl. No.: 380,842

[22] Filed: Jul. 14, 1989

[51] Int. Cl.⁵ .................................................. G06F 9/06
[52] U.S. Cl. ............................ 395/650; 364/DIG. 1;
                                                364/281.7; 364/254.3
[58] Field of Search ... 364/200 MS File, 900 MS File;
                                                              395/650

[56]                    References Cited
                  U.S. PATENT DOCUMENTS

4,622,631  11/1986  Frank et al. .
4,654,819   3/1987  Stiffler et al. .
4,677,546   6/1987  Freeman et al. ........................ 364/200
4,742,447   5/1988  Duvall et al. ........................... 364/200
4,742,450   5/1988  Duvall et al. .
4,758,946   7/1988  Shar et al. .............................. 364/200
4,761,737   8/1988  Duvall et al. ........................... 364/200
4,819,154   4/1989  Stiffler et al. .

*Primary Examiner*—Thomas M. Heckler
*Attorney, Agent, or Firm*—Douglas S. Foote

[57]                    ABSTRACT

A method for determining a copy-on-write condition in a UNIX process which includes providing a page table with an entry identifying a memory page location, and providing the entry with a copy-on-write bit. The bit is transferred to a circuit for processing and, if the memory page is to be written to and the copy-on-write bit is set, a copy-on-write fault is generated.

8 Claims, 7 Drawing Sheets

METHOD AND SYSTEM FOR DETERMINING COPY-ON-WRITE CONDITION

The present invention relates to a method and system for managing memory units in an information handling system. More particularly, it relates to a method for determining a copy-on-write condition and the structure of a page table entry for a UNIX process.

BACKGROUND OF THE INVENTION

A computer software operating system controls the execution of programs and may provide services such as memory management. An operating system is generally designed for a particular system architecture and for a particular application or environment. For example, the UNIX operating system is designed primarily for a multiple user environment.

A multiple user system generally permits multiprogramming wherein more than a single process resides in the main memory at the same time. Multiprogramming requires a division or partitioning of memory commonly referred to as memory management. A known memory management technique, which is used by UNIX, is known as paging. Paging involves the partitioning of memory into equal fixed-size chunks known as frames and the division of each process into the same size chunks known as pages. Pages are allocated to frames which are distributed throughout the memory. In order to keep track of the physical location of each memory page, the operating system maintains a page table. The page table includes a number of entries, referred to as page table entries, each of which shows the frame location for each page of a process. Each process operates with logical addresses which include a page number and relative address within the page. In order to access a memory page, the page number is used to address an entry in the page table in order to obtain the frame location.

In addition to containing the frame location, each page table entry includes a number of control bits. These additional bits are divided into hardware control bits and software control bits. The hardware control bits are used to generate various control signals. Two of these bits are used to control access to the data. For example, the bits can define a read only condition in which case the data page cannot be written to, a write only condition wherein the data page cannot be read, or the bits can define a read/write condition in which case the data page can be read or written to. The software control bits do not generate a control signal per se, but rather contain information that may be examined by software. Typical software control bits are so-called "aging" bits which track how recently a page has been used. When new pages need to be moved into memory, these aging bits are analyzed by a least recently used (LRU) algorithm to determine which pages to remove from the memory.

A feature of the UNIX operating system is that two or more processes may share the same data page. However, before one of the processes is permitted to write to the shared page, the page must first be copied. After copying the page, the process may modify its copy (which is no longer shared with the other processes). In the past, the software control bits in the page table entry have included a "copy-on-write" bit. This copy-on-write bit provides information as to whether or not the particular page has been previously copied. In prior UNIX systems, when a data page is accessed for a write operation, the data access (hardware control) bits in the page table entry generate an error signal if the bits indicate a read only page. The software then determines whether the copy-on-write bit is set. If the copy-on-write bit is set, the page is copied and the process continues. If the copy-on-write bit is not set, the read only error signal is valid and no modification of the page may be effected.

A problem with the existing systems is that when a read only error is generated, the copy-on-write bit must always be checked by the system software. The copy-on-write bit check is carried out only after the read only error is generated. This introduces a delay into the system operation. In addition, the number of software bits in a page table entry are limited in the UNIX operating system. Such software bits as are available are particularly valuable as aging bits because more aging bits allow more powerful and efficient LRU algorithms.

OBJECTS OF THE INVENTION

It is therefore an object of the present invention to provide a new and improved method for determining a copy-on-write condition in a UNIX process.

It is another object of the present invention to provide a new and improved method for writing data to a memory page in a UNIX process.

It is a further object of the present invention to provide a new and improved method for managing memory units in an information handling system.

It is yet another object of the present invention to provide a computer system with page table memory and entry having improved efficiency.

SUMMARY OF THE INVENTION

One form of the present invention is a method for determining a copy-on-write condition in a UNIX process. The method includes providing a page table with an entry identifying a memory page location, and providing the entry with a copy-on-write bit. The bit is transferred to a circuit for processing and, if the memory page is to be written to and the copy-on-write bit is set to a predetermined value, a copy-on-write fault is generated.

Another form of the present invention is a method for writing data to a memory page in a UNIX process. The method includes providing a page table with an entry identifying a memory page location, and providing the entry with data access protection bits and a copy-on-write bit. The bits are transferred to a circuit for processing and, if the access protection bits allow the memory page to be written to and the copy-on-write bit is set to a predetermined value, a copy-on-write fault is generated. The memory page is then copied as a new page and data may be written to either the memory or new page.

Other forms of the present invention are a page table entry and a page table memory for a UNIX process and a system for running two or more UNIX processes having a shared memory page. The page table entry comprises a plurality of hardware control bits wherein the bits include data access protection bits and a copy-on-write bit. The system comprises a page table memory having an entry with a plurality of hardware control bits, software control bits and memory page address bits for the memory page, wherein the hardware control bits include access protection and copy-on-write bits.

DESCRIPTION OF A PREFERRED EMBODIMENT

Figure 1:
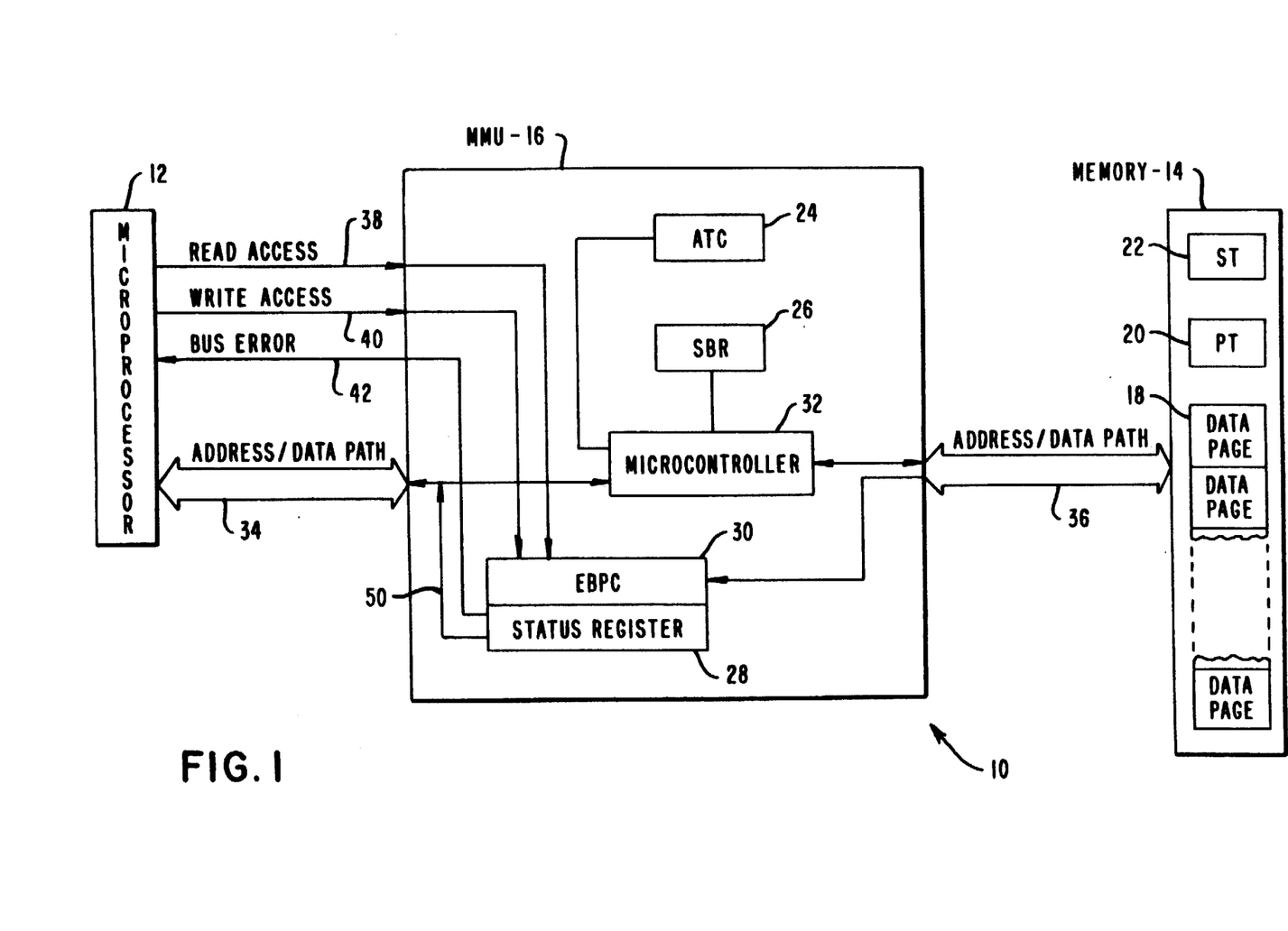
FIG. 1 is a block diagram of a computer system according to one form of the present invention.

FIG. 1 shows a block diagram of a computer system 10 according to one form of the present invention. Computer system 10 includes a microprocessor 12, a main memory 14, and a memory management unit 16 connected therebetween. System 10 is part of a multiprogramming system in which the part of memory 14 allocated to users is subdivided to accommodate multiple processes. The present invention is particularly applicable to a multiprogramming operating system such as UNIX. A feature of the UNIX system which is most relevant to the subject invention is the copy-on-write function.

With UNIX, main memory 14 is partitioned into fixed length segments known as data pages 18. In a preferred embodiment, each page consists of 4K bytes of data. The address of each page is stored in respective entries in a page table 20 which also resides in main memory 14. In order to minimize the amount of storage space, multiple processes may utilize the same data page. However, if a process intends to change data on a given page, the page must first be copied before being written to. This is regulated by means of the copy-on-write bit included in the page table entry for each data page.

As noted above, the present invention is particularly adapted for use with the UNIX operating system. A feature of this system is the use of both paging and segmentation as memory management tools. Segmentation is another way in which memory can be subdivided. Segments are generally larger than memory pages and being visible to the user provide a convenient way for organizing data and programs. Like data pages, segments are located by means of a entries in a segment table, the segment table entries having data access bits associated therewith. Accordingly, memory 14 includes a segment table 22.

Memory management unit 16 includes an address translation cache 24, a segment base register 26, a status register 28, an error bit processing circuit 30, and a microcontroller 32. An address bus 34 connects memory management unit 16 to microprocessor 12, and an address bus 36 connects memory management unit 16 to memory 14. Error bit processing circuit 30 is connected to main memory 14 through address bus 34 and receives certain hardware control bits (as will be discussed more fully hereinafter) therefrom. In addition, error bit processing circuit 30 is connected to control signal lines 38 and 40 for receiving READ ACCESS and WRITE ACCESS control signals, respectively, from microprocessor 12. Status register 28 is connected to microprocessor 12 by a control line 42 and provides a bus error signal over line 42 to microprocessor 12. Status register 28 is also connected to microprocessor 12 by bus 50 over which the microprocessor 12 may read the contents of register 28.

FIGS. 2A-2D show the operation of memory management unit 16 for a UNIX process. An address 60 is placed on bus 34 (FIG. 1). Address 60 includes four parts: a virtual address designation (V), a segment number (SN), a page number (PN) and a byte offset (BO). The virtual address designation supplies the information describing whether address 60 is a virtual or real address. The microprocessor makes an initial determination at box 62 as to whether or not address 60 is a virtual or real address. If address 60 is a real address, memory management unit 16 is disabled (block 64) and the memory is addressed directly by address 60. It will be noted that the copy-on-write function is not used for real memory accesses. If address 60 is a virtual address as indicated by the virtual address designation, memory management unit 16 is enabled (block 66) and the address translation cache (ATC) is searched (blocks 66 and 68). The ATC is located in memory management unit 16 and contains the most recently translated addresses. If the translated address in the ATC, the virtual to real address translation is performed using the values in the ATC (block 70). The virtual to real address translation using the ATC will be described further on with respect to FIG. 2D. If address 60 is not in the ATC, a virtual to real address translation is commenced starting with a "table walk" (block 72) to obtain the segment table entry (STE). The address of the STE is provided by an entry from the segment base register in memory management unit 16 combined with the SN from address 60 (block 74). The validity of the STE is checked (block 76), and if invalid, a bus error (STE VALID) is issued (block 78). If the STE is valid, a check is made to determine whether the segment is resident in main memory (block 80). If not resident, a bus error (STE RESIDENT) is issued (block 82). This bus error causes the page table to brought into main memory and memory management unit 16 restarts its operation at block 62. However, if the STE is resident in main memory, two conditions are checked. First, a write protection bit in the STE is checked. Second, control line 38 is checked to see if a WRITE ACCESS is desired. If it is write protected and the WRITE ACCESS signal is active, a bus error (STE WRITE PROTECTED) is issued (block 86). If it is not write protected, the page table entry (PTE) is fetched (block 88) from the page table using the STE and PN.

The validity of the PTE is checked (block 90), and if invalid, a bus error (PTE VALID) is issued (block 92). If the PTE is valid, a check is made to see whether it is located in main memory (block 94). If not in main memory, a bus error (PTE RESIDENT) is issued (block 96). If the PTE is resident in main memory, a check is made of the protection bits in the PTE to see if there is an illegal access to the PTE (block 98). If there is an illegal access, a bus error (PTE READ ONLY) is issued (block 100). If the access is legal, a check is made of control line 40 and the copy-on-write access protection bit (block 102). If it is desired to write to the data page (WRITE ACCESS active) and if the page is write protected (C/W bit set), a bus error (C/W VIOLATION) is issued (block 104). If the page is not write protected, the PTE and BO are combined to form the physical address of the desired data byte (block 106). The address may then be strobed for an access.

Figures 2, 2D:
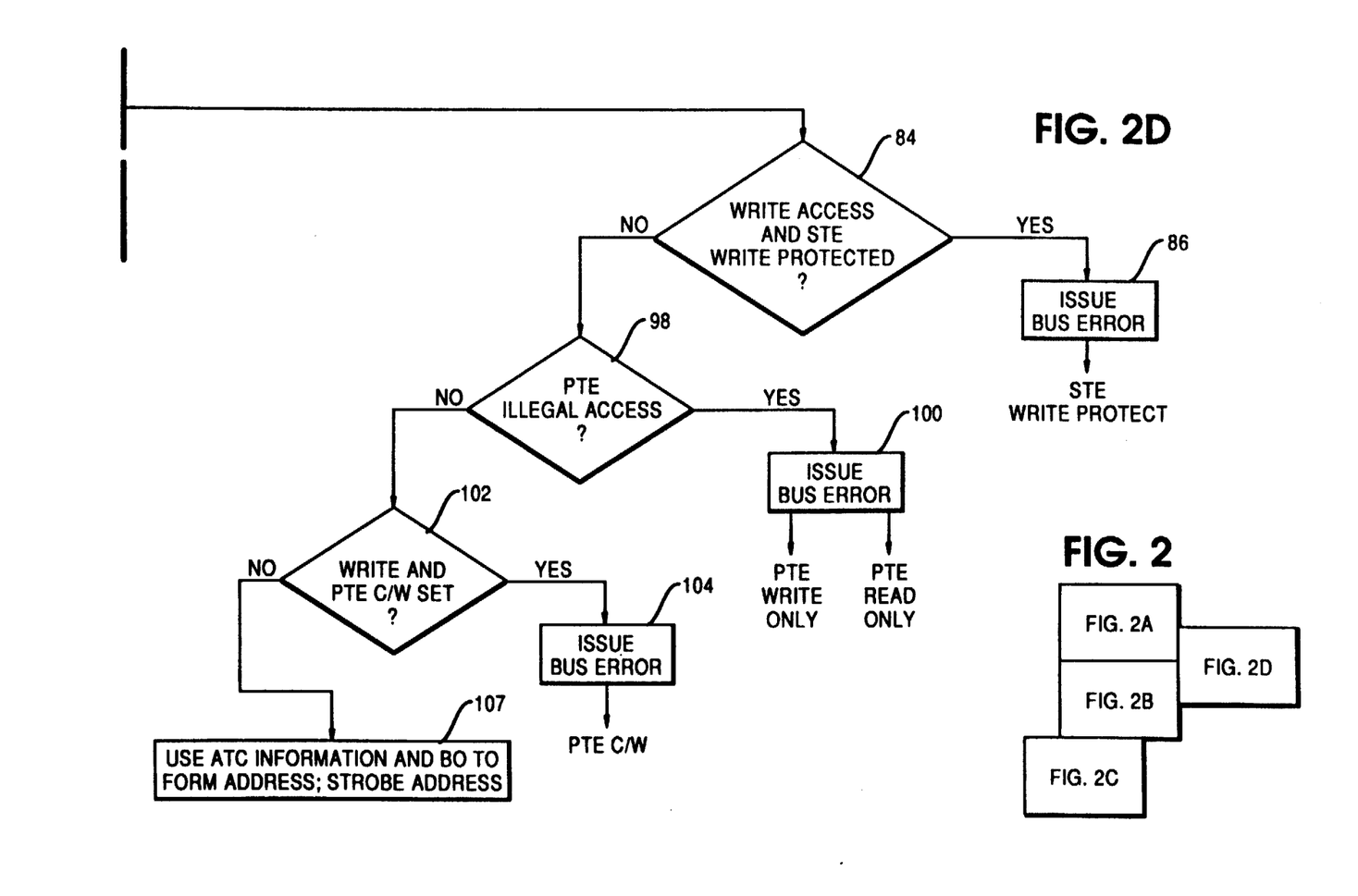
FIGS. 2A-2D arranged as shown in FIG. 2 are a flow chart showing the operation of a virtual to real address translation.
Figure 2A:
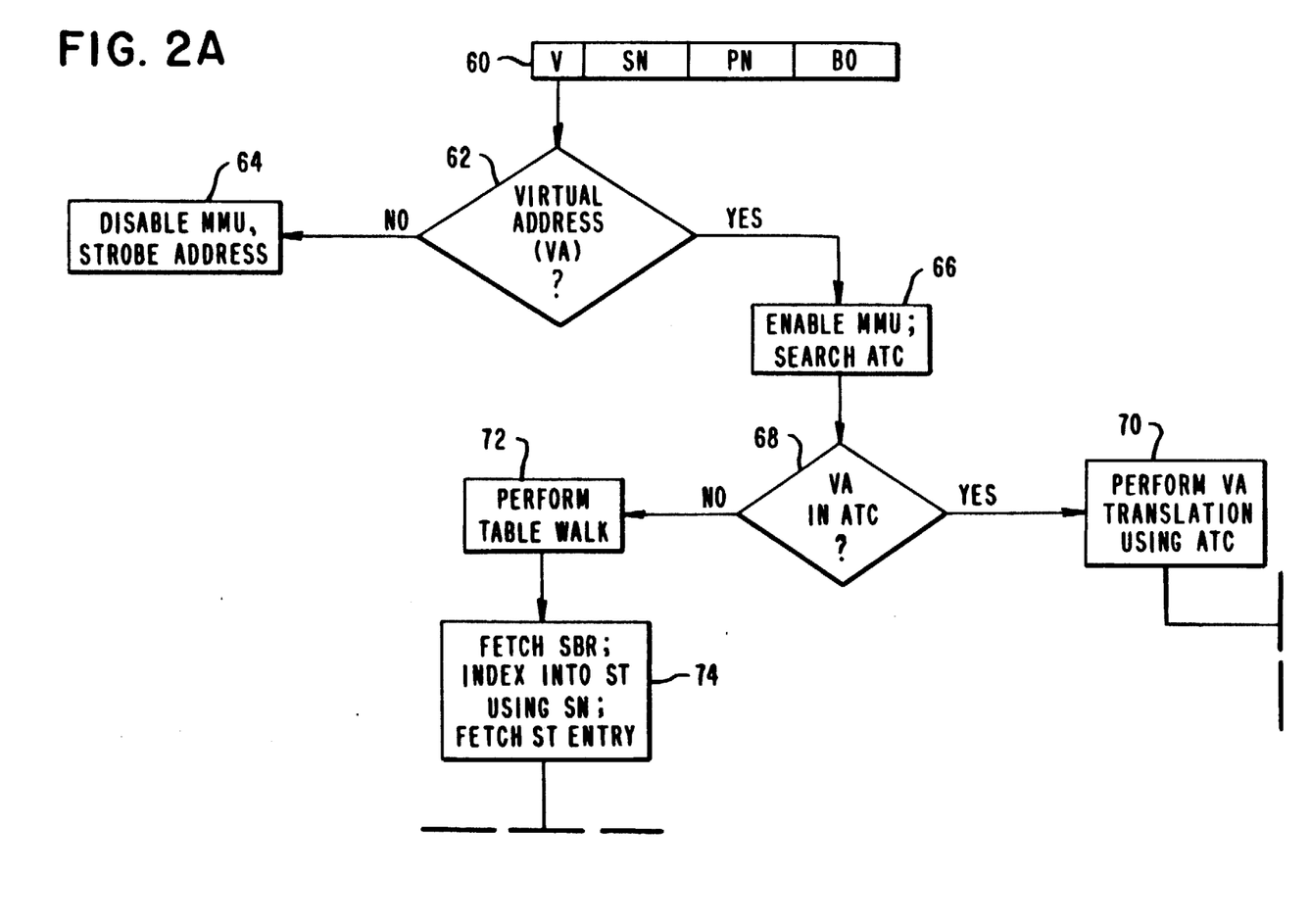
Figure 2B:
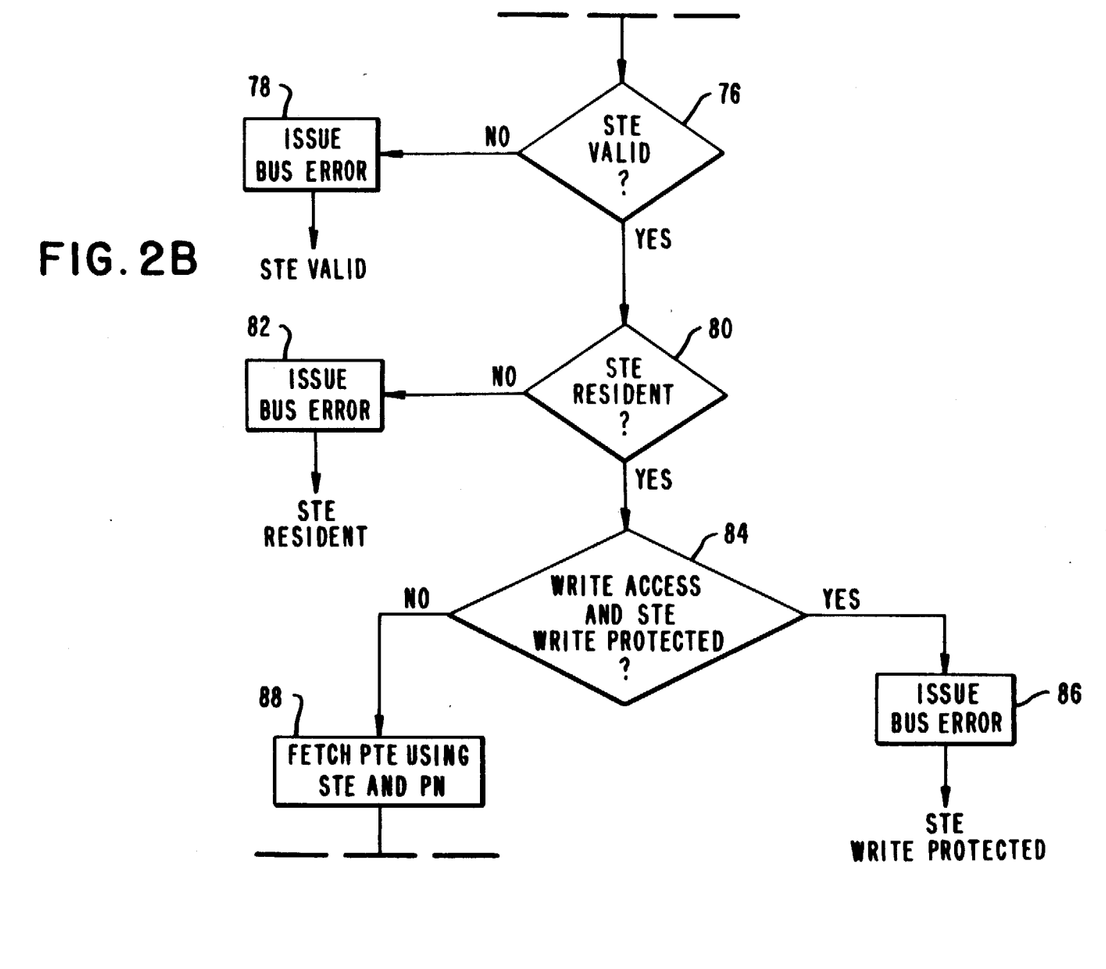
Figure 2C:
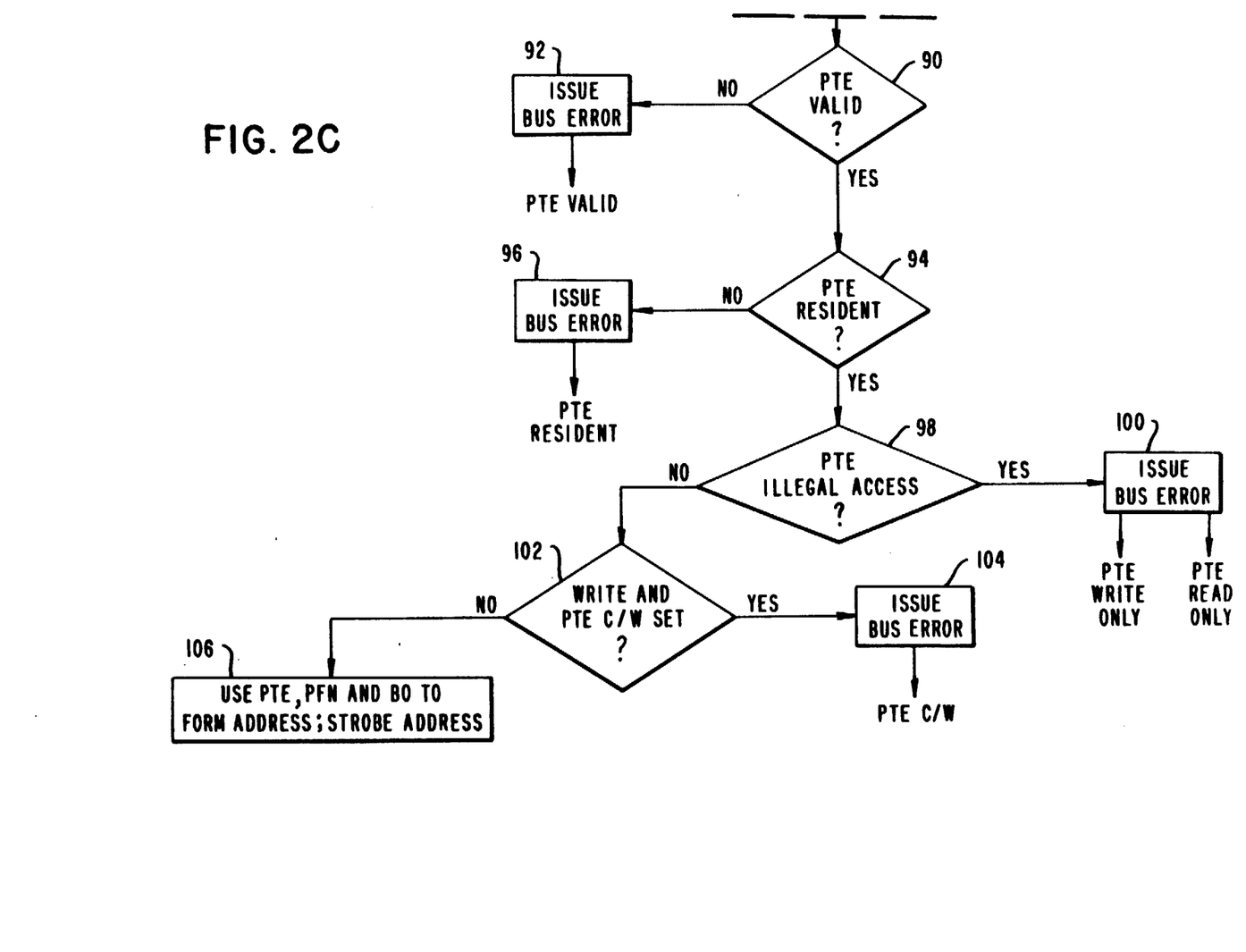

FIG. 2D shows the virtual address translation of block 70 shown in FIG. 2A. It will be noted that similarly labeled blocks are described above with respect to FIGS. 2B and 2C. In the final step (block 107) wherein the page is not write protected, the information in the address translation cache (ATC) and BO are combined to form the physical address of the desired data byte (block 106).

Figure 3:
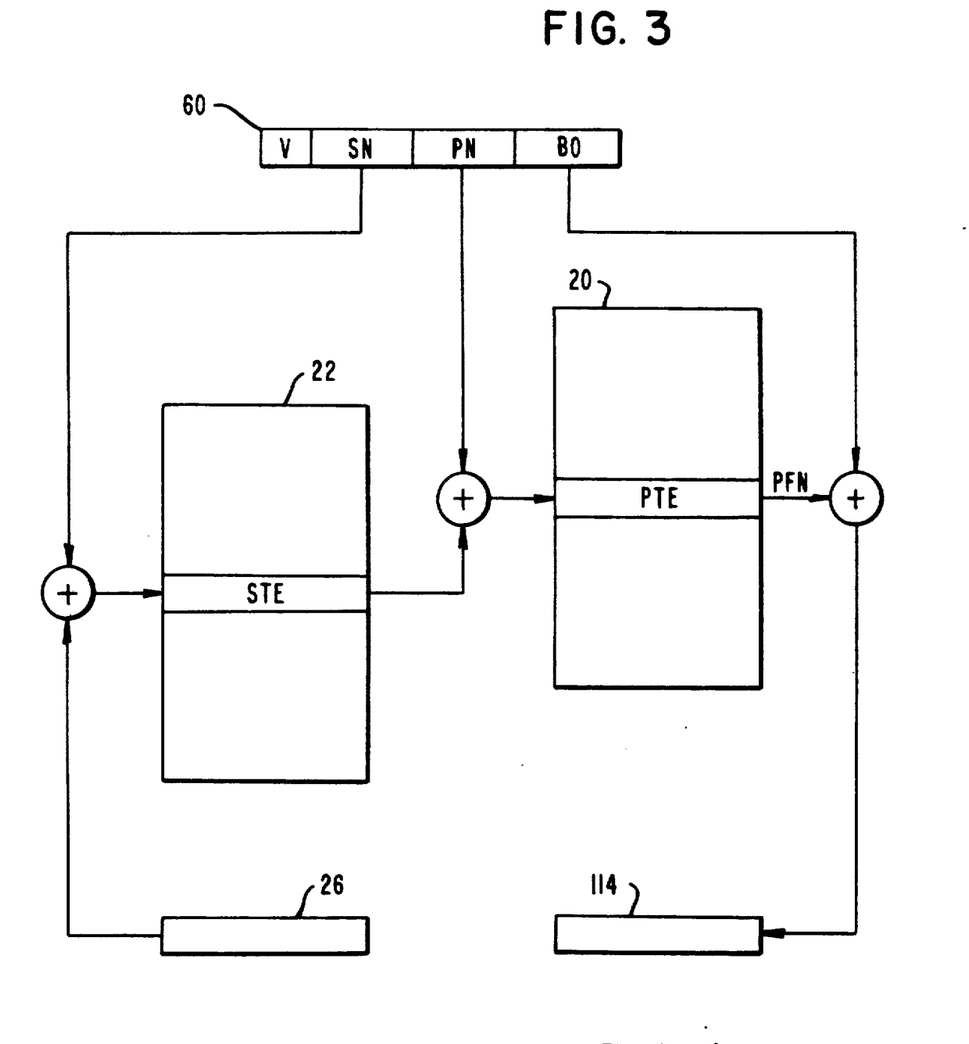
FIG. 3 is a diagram showing a virtual to real address translation as described in FIG. 3.

FIG. 3 shows in schematic form the formation of a physical address 114 from the virtual address 60, as described above. The STE in segment table 22 is obtained by combining the entry in the segment base register 26 with the SN from virtual address 60. The STE is combined with the PN from address 60 to locate the PTE from page table 20. Finally, the page frame number (PFN) of the PTE is combined with the BO to form the physical address 114.

Figure 4:
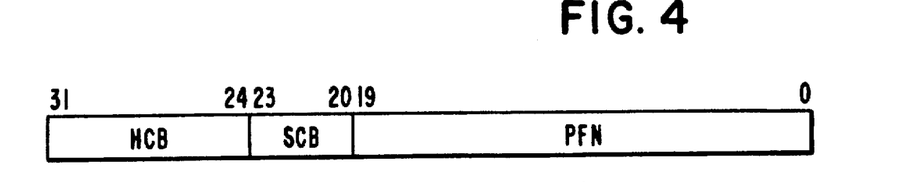
FIG. 4 shows a page table entry.

FIG. 4 shows more detail of the organization of a page table entry (PTE) for a UNIX process. The lower order 20 bits are allocated to the page frame number (PFN) and are the memory page address bits. The next higher four bits (20 through 23) are reserved for software control bits which may be used, for example, as aging bits. The high order eight bits (24 through 31) are allocated for hardware control bits. Two of these hardware control bits are designated as access control bits. The access control bits may indicate whether the data page may be both read from and written to, whether the page is invalid, or whether the page may be read only. According to the present invention, one of the hardware control bits is designated as a copy-on-write bit.

Figure 5:
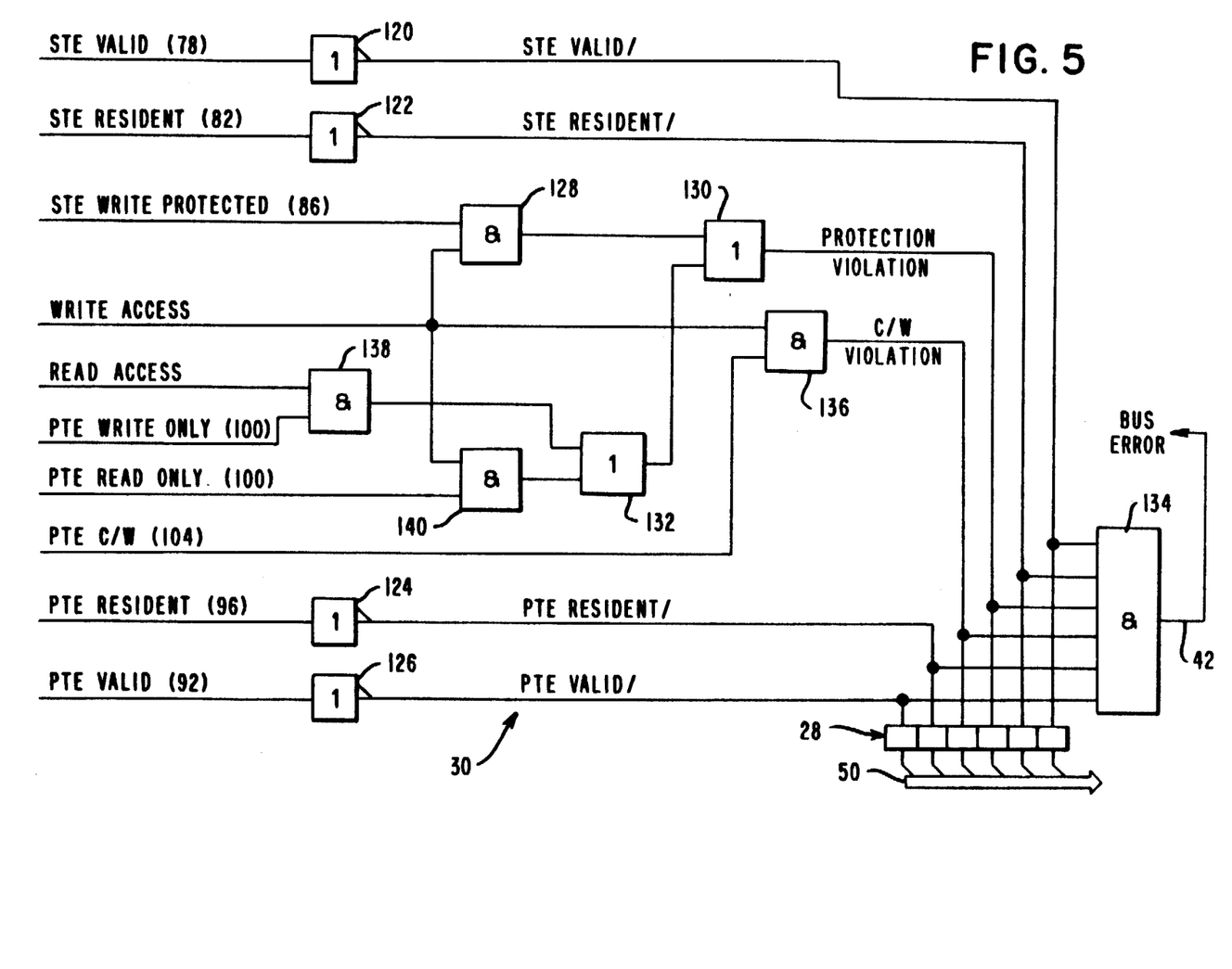
FIG. 5 shows the error bit processing circuit of FIG. 1.

FIG. 5 shows more detail of status register 28 and error bit processing circuit 30 shown in FIG. 1. Circuit 30 receives various error signals from memory 14, as described in FIG. 2. More particularly, it receives a bit indicating whether the segment table entry is valid (STE VALID), (FIG. 2, block 78); a bit indicating whether the segment table entry is resident in main memory (STE RESIDENT), (FIG. 2, block 82); and a bit indicating whether the segment table entry is write protected (STE WRITE PROTECTED), (FIG. 2, block 86). Circuit 12 also receives bits indicating whether the memory access is a write or read operation (WRITE ACCESS and READ ACCESS, respectively) (FIG. 1). Further, circuit 12 receives bits indicating whether the page table entry is access controlled as a write only or read only (WRITE ONLY and READ ONLY, respectively), (FIG. 2, block 100); the copy-on-write bit (PTE C/W), (FIG. 2, block 104); a bit indicating whether the page table entry is resident in main memory (PTE VALID), (FIG. 2, block 96); and a bit indicating whether the page table entry is valid (PTE VALID), (FIG. 2, block 92).

Circuit 30 includes inverters 120, 122, 124 and 126; OR gates 130, 132 and 134; and AND gates 128, 136, 138 and 140. Inverter 120 receives the STE VALID signal on its input and has an output which is connected to register 28 and which provides an STE VALID/ signal thereto. Inverter 122 receives the STE RESIDENT signal on its input and has an output which is connected to register 28 and which provides an STE RESIDENT/ signal thereto. Inverter 124 receives the PTE RESIDENT signal on its input and has an output which is connected to register 28 and which provides a PTE RESIDENT/ signal thereto. Inverter 126 receives the PTE VALID signal on its input and has an output which is connected to register 28 and which provides a PTE VALID/ signal thereto. AND gate 138 receives the READ ACCESS and PTE WRITE ONLY signals on its inputs, AND gate 140 receives the WRITE ACCESS and PTE READ ONLY signals on its inputs, and AND gate 128 receives the STE WRITE PROTECTED and WRITE ACCESS signals on its inputs. The inputs to OR gate 132 are connected to the outputs of AND gates 138 and 140, respectively, and the inputs to OR gate 130 are connected to the outputs of AND gate 128 and OR gate 132, respectively. The output of OR gate 130 is connected to register 28 and provides a PROTECTION VIOLATION signal thereto. The inputs of AND gate 136 receive the WRITE ACCESS and PTE C/W signals, respectively, and its output is connected to register 28 and provides a C/W VIOLATION signal thereto. OR gate 134 has inputs connected to respective outputs of inverters 120, 122, 124 and 126, OR gate 130, and AND gate 136. OR gate 134 provides at its output a BUS ERROR signal which is provided to microprocessor 12 over control line 42 (see FIG. 1). Register 28 may be read directly by microprocessor 12 over bus 50.

In operation, when a PTE copy-on-write bit (PTE C/W signal) is set and is transferred to circuit 30 and the subject memory page is to be written to (WRITE ACCESS signal from microprocessor 12 is active), a copy-on-write fault (C/W VIOLATION signal) is generated by AND gate 136. The C/W VIOLATION signal is transferred to register 28 and provided to microprocessor 12 (FIG. 1) as a BUS ERROR signal. However, microprocessor 12 will first check whether there is a PROTECTION VIOLATION signal generated by OR gate 130 by reading status register 28. If there is a PROTECTION VIOLATION signal generated, the data page will not be written to. If there is no PROTECTION VIOLATION signal, the subject memory page will be copied, a new entry in the page table will be created for the new page, and the C/W bit for the new page table entry will be cleared. Data may now be written to either the original or, preferably, the new page.

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent of the United States is as follows.

1. A method for determining a copy-on-write condition in a UNIX process comprising:
   providing a page table with an entry identifying a memory page location;
   providing said entry with a copy-on-write bit;
   transferring said bit to a circuit; and
   generating a copy-on-write fault in said circuit if said memory page is to be written to and said copy-on-write bit is set to a predetermined value.

2. A method for writing data to a memory page in a UNIX process comprising:
   providing a page table with an entry identifying a memory page location;
   providing said entry with data access protection bits and a copy-on-write bit;
   transferring said bits to a circuit; and
   if said access protection bits allow said memory page to be written to and said copy-on-write bit is set to a predetermined value;
   generating a copy-on-write fault in said circuit;
   copying said memory page as a new page; and writing data to either said memory page or new page.

3. The method of claim 2 further comprising between said copying and writing step:
generating a new entry in said page table for said new page; and
clearing the copy-on-write bit for said new entry.

4. The method of claim 2 wherein said step of generating a copy-on-write fault comprises:
transferring said copy-on-write fault said circuit to a status register.

5. The method of claim 4 further comprising:
reading said status register prior to said copying step.

6. A method for writing data to a memory page in a UNIX process comprising:
providing a page table with an entry identifying a memory page location;
providing said entry with data access protection bits and a copy-on-write bit;
transferring said bits to a circuit; and
if said access protection bits allow said memory page to be written to and said copy-on-write bit is set;
generating a copy-on-write fault in said circuit and providing said copy-on-write fault from said circuit to a status register;
reading said status register;
copying said memory page s a new page;
generating an entry in said page table for said new page;
clearing the copy-on-write bits for said entries; and
writing data to either said memory or new page.

7. A method for managing memory units accessible by two or more processes on a computer comprising:
providing a table with entry identifying a memory unit location;
providing said entry with a copy-on-write bit;
transferring said bit to a circuit; and
generating a copy-on-write fault in said circuit if said memory unit is to be written to and said copy-on-write bit is set to a predetermined value.

8. A computer system, for running two or more UNIX processes having a shared memory page, comprising:
a page table memory having an entry with a plurality of hardware control bits, software control bits and memory page address bits for said memory page, wherein said hardware control bits are connectable to a circuit which receives said bits and generates a control signal in response thereto, and wherein said hardware control bits includes access protection and copy-on-write bits; and
a status register connected to said circuit for storing a copy-on-write fault whenever said memory page is to be written and said copy-on-write bit is set.

* * * * *